(12) United States Patent
Tsuboi

(10) Patent No.: US 9,983,865 B2
(45) Date of Patent: May 29, 2018

(54) IMAGE FORMING APPARATUS, METHOD OF CONTROLLING THE SAME, AND NON-TRANSITORY COMPUTER READABLE STORAGE MEDIUM

(71) Applicant: CANON KABUSHIKI KAISHA, Tokyo (JP)

(72) Inventor: Masanori Tsuboi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 295 days.

(21) Appl. No.: 14/748,779

(22) Filed: Jun. 24, 2015

(65) Prior Publication Data

US 2016/0019048 A1 Jan. 21, 2016

(30) Foreign Application Priority Data

Jul. 15, 2014 (JP) .................. 2014-145383

(51) Int. Cl.
```
G06F 9/44      (2018.01)
G06F 9/445     (2018.01)
G06F 3/12      (2006.01)
G06F 11/14     (2006.01)
```
(52) U.S. Cl.
CPC .............. *G06F 8/65* (2013.01); *G06F 3/123* (2013.01); *G06F 3/1203* (2013.01); *G06F 3/1285* (2013.01); *G06F 11/14* (2013.01); *G06F 11/1433* (2013.01); *G06F 11/1441* (2013.01)

(58) Field of Classification Search
CPC ................................. G06F 8/65; H04L 67/34
USPC .................................................. 717/168–178
See application file for complete search history.

(56) References Cited

U.S. PATENT DOCUMENTS

| | | | | |
|---|---|---|---|---|
| 6,505,200 B1 * | 1/2003 | Ims | ................... | G06F 17/30179 707/638 |
| 7,526,788 B2 * | 4/2009 | Rodriguez | ............... | H04N 7/08 725/86 |
| 7,669,195 B1 * | 2/2010 | Qumei | ................... | G06F 8/665 709/247 |
| 7,689,981 B1 * | 3/2010 | Gustafson | ........... | G06F 11/1004 711/5 |
| 7,877,778 B2 * | 1/2011 | Hamada | ............... | H04N 5/4401 725/132 |

(Continued)

FOREIGN PATENT DOCUMENTS

JP    2004-042304 A    2/2004

*Primary Examiner* — Jae Jeon
(74) *Attorney, Agent, or Firm* — Fitzpatrick, Cella, Harper & Scinto

(57) ABSTRACT

An image forming apparatus capable of executing update processing for updating firmware, comprises: a setting unit which sets either a first setting indicating that the update processing is executed periodically or a second setting indicating that the update processing is executed at a particular date/time rather than periodically; an obtaining unit which obtains update firmware for updating; an extraction unit which executes extraction processing for extracting the update firmware; a determination unit which determines, in a case where the extraction processing is interrupted due to a power-off and the image forming apparatus re-boots, whether the first setting or the second setting is set by the setting unit; and a deciding unit which, based on a result of the determination by the determination unit, decide whether or not to re-execute the extraction processing.

3 Claims, 6 Drawing Sheets

(56) References Cited

U.S. PATENT DOCUMENTS

| | | | | |
|---|---|---|---|---|
| 7,934,210 B1* | 4/2011 | Stampfli | G06F 8/61 | 709/220 |
| 8,392,573 B2* | 3/2013 | Lehr | H04L 67/02 | 709/217 |
| 8,812,471 B2* | 8/2014 | Akita | G06Q 30/06 | 705/7.27 |
| 9,038,110 B2* | 5/2015 | Kvache | H04H 20/57 | 725/39 |
| 2001/0029178 A1* | 10/2001 | Criss | G06F 8/65 | 455/419 |
| 2004/0187103 A1* | 9/2004 | Wickham | G06F 8/65 | 717/168 |
| 2006/0080656 A1* | 4/2006 | Cain | G06F 8/65 | 717/174 |
| 2008/0040712 A1* | 2/2008 | Tanaka | G06F 8/65 | 717/168 |
| 2008/0148268 A1* | 6/2008 | Hirouchi | G06F 8/67 | 718/103 |
| 2008/0222462 A1* | 9/2008 | Sakata | H04N 21/4117 | 714/704 |
| 2010/0146140 A1* | 6/2010 | Stryzak | H04L 12/1859 | 709/231 |
| 2010/0250566 A1* | 9/2010 | Paul | G06F 17/30592 | 707/756 |
| 2011/0126185 A1* | 5/2011 | Waris | H04L 12/588 | 717/169 |
| 2011/0131562 A1* | 6/2011 | Tanaka | G06F 8/61 | 717/168 |
| 2011/0271271 A1* | 11/2011 | Wahoske | G06F 8/65 | 717/173 |
| 2012/0084508 A1* | 4/2012 | Suzuki | G06F 11/2089 | 711/114 |
| 2012/0210313 A1* | 8/2012 | Cooley | G06F 8/65 | 717/171 |

* cited by examiner

F I G. 1
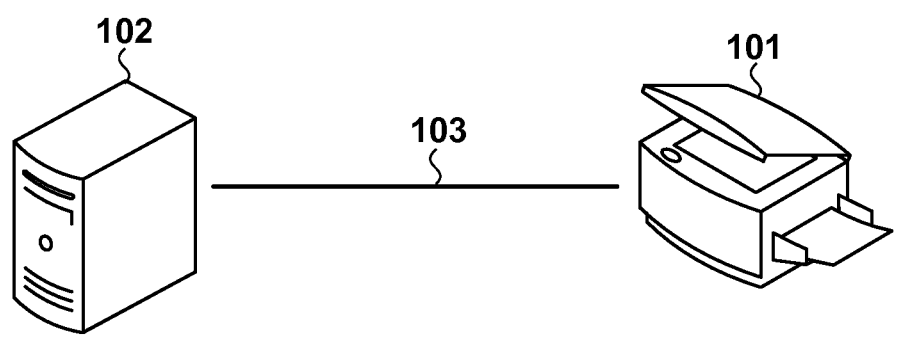

IMAGE FORMING APPARATUS, METHOD OF CONTROLLING THE SAME, AND NON-TRANSITORY COMPUTER READABLE STORAGE MEDIUM

BACKGROUND OF THE INVENTION

Field of the Invention

The present invention relates to an image forming apparatus, a method of controlling the same, and a non-transitory computer readable storage medium.

Description of the Related Art

In image forming apparatuses which have firmware installed, there are cases when firmware is updated for the addition of new functions, program correction, or the like. A common flow to a method to update firmware is to, based on an instruction of a user, download firmware from a network connected external server, to extract the downloaded firmware and to perform the update. While extracting the firmware or during the update, since the image forming apparatus transitions to a mode for updating, the user ceases to be able to use the image forming apparatus, creating downtime.

When the image forming apparatus is powered off while updating the firmware, there is a possibility that it will not be able to boot normally upon the next boot. Japanese Patent Laid-Open No. 2004-42304 discloses a configuration for performing a recovery process during an firmware update failure.

Meanwhile, there is a method for minimizing downtime by performing in advance processing for extracting downloaded firmware in the background during normal operation, and not while in an updating mode as described above, (hereinafter referred to as background extraction).

In Japanese Patent Laid-Open No. 2004-42304, when power is turned off during background extraction, background extraction recovery processing is performed uniformly during the next boot. However, depending on the update method (execution timing etc.), there are cases in which the firmware that was the target of background extraction during the power-off becomes unnecessary, and is not used. For this reason, there are cases when the process itself is wasteful if the recovery process is performed uniformly.

SUMMARY OF THE INVENTION

The present invention provides a means of switching, according to an update method, a recovery process for when firmware extraction has failed.

According to one aspect of the present invention, there is provided an image forming apparatus capable of executing update processing for updating firmware, the apparatus comprising: a setting unit configured to set, as a setting regarding the update processing, either a first setting indicating that the update processing is executed periodically or a second setting indicating that the update processing is executed at a particular date/time rather than periodically; an obtaining unit configured to obtain update firmware for updating firmware of the image forming apparatus; an extraction unit configured to execute extraction processing for extracting the update firmware that the obtaining unit obtains; a determination unit configured to determine, in a case where the extraction processing is interrupted due to a power-off and the image forming apparatus re-boots, whether the first setting or the second setting is set by the setting unit; and a deciding unit configured to, based on a result of the determination by the determination unit, decide whether or not to re-execute the extraction processing.

According to another aspect of the present invention, there is provided an image forming apparatus capable of executing update processing for updating firmware, the apparatus comprising: a setting unit configured to set, as a setting regarding the update processing, a obtainment time for obtaining update firmware for updating firmware of the image forming apparatus, and an application time for applying the update firmware to the image forming apparatus; an obtaining unit configured to obtain the update firmware based on the obtainment time set by the setting unit; an extraction unit configured to execute extraction processing for extracting the update firmware that the obtaining unit obtains; a determination unit configured to determine, in a case where the extraction processing is interrupted due to a power-off and the image forming apparatus re-boots, whether the application time set by the setting unit has passed; a deciding unit configured to, based on a result of the determination by the determination unit, decide whether or not to re-execute the extraction processing.

According to another aspect of the present invention, there is provided a method for controlling an image forming apparatus capable of executing update processing for updating firmware, the method comprising: setting, as a setting regarding the update processing, either a first setting indicating that the update processing is executed periodically or a second setting indicating that the update processing is executed at a particular date/time rather than periodically; obtaining update firmware for updating firmware of the image forming apparatus; executing extraction processing for extracting the update firmware obtained in the obtaining step; determining, in a case where the extraction processing is interrupted due to a power-off and the image forming apparatus re-boots, whether the first setting or the second setting is set in the setting step; and deciding, based on a result of the determination in the determining step, whether or not to re-execute the extraction processing.

According to another aspect of the present invention, there is provided a non-transitory computer-readable storage medium storing a program for causing a computer capable of executing update processing for updating firmware to execute: setting, as a setting regarding the update processing, either a first setting indicating that the update processing is executed periodically or a second setting indicating that the update processing is executed at a particular date/time rather than periodically; obtaining update firmware for updating firmware of the computer; executing extraction processing for extracting the update firmware obtained in the obtaining step; determining, in a case where the extraction processing is interrupted due to a power-off and the computer re-boots, whether the first setting or the second setting is set in the setting step; and deciding, based on a result of the determination in the determining step, whether or not to re-execute the extraction processing.

According to another aspect of the present invention, there is provided a method for controlling an image forming apparatus capable of executing update processing for updating firmware, the method comprising: setting, as a setting regarding the update processing, a obtainment time for obtaining update firmware for updating firmware of the image forming apparatus, and an application time for applying the update firmware to the image forming apparatus; obtaining the update firmware based on the obtainment time set in the setting step; executing extraction processing for extracting the update firmware obtained in the obtaining step; determining, in a case where the extraction processing is interrupted due to a power-off and the image forming apparatus re-boots, whether the application time set in the setting step has passed; deciding, based on a result of the determination in the determining step, whether or not to re-execute the extraction processing.

According to another aspect of the present invention, there is provided a non-transitory computer-readable storage medium storing a program for causing a computer capable of executing update processing for updating firmware to execute: setting, as a setting regarding the update processing, a obtainment time for obtaining update firmware for updating firmware of the image forming apparatus, and an application time for applying the update firmware to the image forming apparatus; obtaining the update firmware based on the obtainment time set in the setting step; executing extraction processing for extracting the update firmware obtained in the obtaining step; determining, in a case where the extraction processing is interrupted due to a power-off and the image forming apparatus re-boots, whether the application time set in the setting step has passed; deciding, based on a result of the determination in the determining step, whether or not to re-execute the extraction processing.

The present invention is related to a recovery process for when firmware extraction has failed, and makes possible omitting wasteful recovery processing.

Further features of the present invention will become apparent from the following description of exemplary embodiments (with reference to the attached drawings).

BRIEF DESCRIPTION OF THE DRAWINGS

FIG. 1 A view for illustrating an example configuration of a system.

DESCRIPTION OF THE EMBODIMENTS

Figure 2:
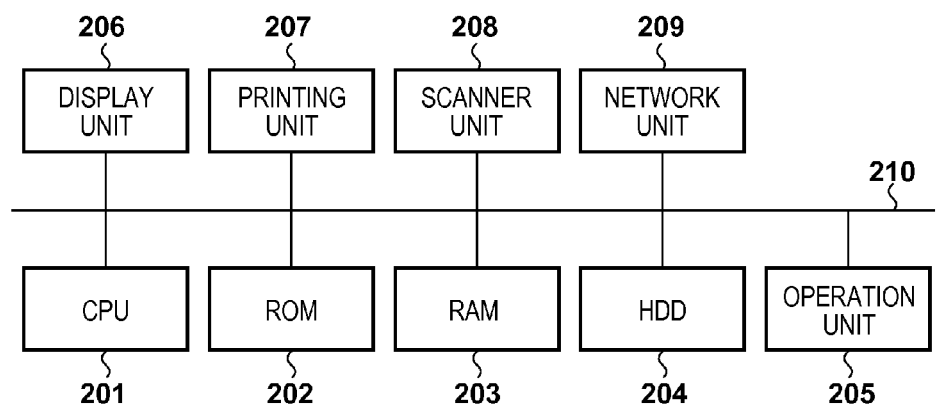
FIG. 2 A view for showing an example of a hardware configuration of an image forming apparatus.

Below, embodiments of the invention will be explained explanatorily with reference to the drawings. However, the elements described in the embodiments below are simply examples, and do not limit the scope of the invention.

Definition of Terms

Firstly, terms of the present invention will be defined.

"User" indicates a person who uses a function such as that of a printer, a scanner, a copy, a FAX or the like of an image forming apparatus. The user can operate a firmware update from a UI (User Interface) of the image forming apparatus.

"Serviceman" indicates a person who visits the user destination (installation destination of the image forming apparatus) for performing maintenance on the image forming apparatus used by the user. The serviceman can instruct a firmware update operation from the UI of the image forming apparatus.

"Normal operation mode" indicates a mode in which a user can use the apparatus and cause functions such as that of a printer, a scanner, a copy, a FAX of the image forming apparatus to operate.

"Updating mode" indicates a mode for performing an update of firmware. More specifically, extraction of the firmware and application to the image forming apparatus is performed, and as a result, the image forming apparatus becomes operable after the update of the firmware. During this mode, functions such as a printer, a scanner, a copy, a FAX and other functions are not usable.

"Firmware download" indicates the image forming apparatus obtaining new firmware from a distribution server and temporarily storing it within the image forming apparatus.

"Firmware extraction" indicates a process for extracting files and programs which configure firmware during the updating mode or the normal operation mode, as advance preparation for performing firmware update. Performing extraction of firmware in the background of operational processing related to normal functions during the normal operation mode is called "background extraction". Performing background extraction makes it possible to perform extraction processing in advance before transitioning into the updating mode, it reduces the time in the updating mode, and it reduces downtime.

"Firmware update" indicates causing firmware for which extraction is complete to be applied to the image forming apparatus. For example, this corresponds to replacement of files, placement in a predetermined location, or the like.

"Downtime" indicates a time period during which the image forming apparatus cannot be used by the user. An explanation will be given in the specification where this indicates the time taken to boot in the updating mode.

"Immediate update" indicates an update method for performing an update immediately after downloading of the firmware is complete.

"Manual update" indicates an update method for performing updating manually in response to an instruction on a UI of the image forming apparatus by a serviceman or a user towards the downloaded firmware.

"Time designated update" indicates an update method wherein an update start timing is designated beforehand to be a time, and performing the update of firmware that is already extracted according to the set time.

"Regular update" indicates an update method wherein, confirmation of a latest firmware is performed periodically every week or every other week to perform the downloading and updating of firmware if a latest version exists on a distribution server.

"Distribution reservation" indicates setting a download start timing and an update start timing beforehand.

First Embodiment

FIG. 1 is a view for illustrating an example configuration of a network system that includes the information processing apparatus according to an embodiment of the present invention. In a system according to the present embodiment an image forming apparatus 101 and a distribution server 102 are connected through a network 103. The image forming apparatus 101 applies to an MFP (Multi Function Peripheral) that is arranged with functions such as those of a printer, a scanner, a copy, a FAX and the like.

The distribution server 102 is used such that the image forming apparatus 101 can download firmware, and holds and manages various firmware in a storage region that is connected internally or externally. Version management of various firmware is performed according to a model of the image forming apparatus 101.

The network 103 is a network such as the Internet, it may be wired or wireless, and its communication method is not limited. The image forming apparatus 101 communicates through the network 103 with the distribution server 102.

FIG. 1 indicates that there is one of each of the image forming apparatus 101 and the distribution server 102; however it is not limited to this, and a plurality of apparatuses may be connected through the network 103.

[Hardware Configuration]

FIG. 2 is a view for showing an example of a hardware configuration of the image forming apparatus 101. A CPU (Central Processing Unit) 201 executes various programs, performs overall control of the image forming apparatus 101, and realizes various functions. The ROM (Read Only Memory) is a storage unit that stores various programs, and is configured as dedicated to reading.

A RAM (Random Access Memory) 203 is a volatile storage unit, and used as system work memory for the CPU 201 to operate, and temporarily stores various data. The CPU 201 loads a program, which is stored to the ROM 202, into the RAM 203, and executes the program. The RAM 203 is configured with an FRAM (registered trademark) and an SRAM that can hold stored content even when a power supply is turned off, as well as a DRAM wherein stored content is cleared after a power supply is turned off.

A HDD (Hard Disk Drive) 204 is a unit that stores various programs. The CPU 201 loads a program and data, which are stored to the HDD 204, into the RAM 203, and executes the program. Also, data of the RAM 203 can be stored to the HDD 204.

An operation unit 205 is used when a user or the like operates the image forming apparatus 101. A display unit 206 displays a UI of the image forming apparatus 101. A printing unit 207 prints various image data including a raster image to a recording medium, or transmits image data to an external apparatus. The printing unit 207 transmits/receives data with each unit through a bus 210. A scanner unit 208 reads an original placed on an original document platen and generates image data. A network unit 209 is an interface for connecting to the network 103, and is used when connecting to the distribution server 102. Each unit described above can mutually perform transmitting/receiving of data through the bus 210.

Figure 3:
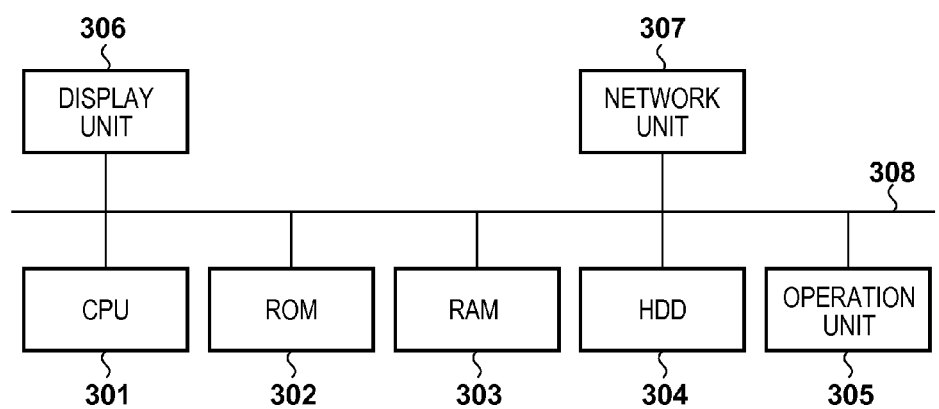
FIG. 3 A view for showing an example of a hardware configuration of a distribution server.

FIG. 3 is a view for showing an example of a hardware configuration of the distribution server 102. Since reference numerals 301-306 and 308 are the same as reference numerals 201-206 and 210 in previously described using FIG. 2, an explanation of these is omitted. A network unit 307 is an interface for connecting to the network 103, and is used when connecting to the image forming apparatus 101.

Additionally, the configurations of FIGS. 2 and 3 are only one example and a configuration may be taken such that other units are further included in each apparatus.

[Software Configuration]

Figure 4:
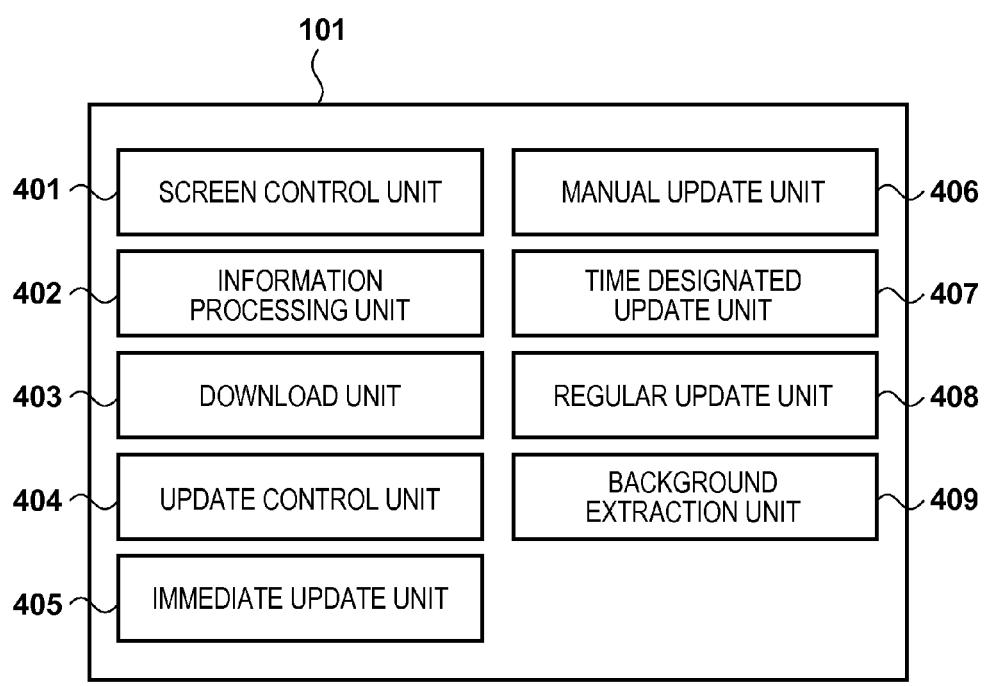
FIG. 4 A view for showing an example of a software configuration of an image forming apparatus.

FIG. 4 is a view for showing an example of a software configuration of the image forming apparatus 101. Programs indicated here, which realize the configuration units, are stored to the HDD 204, and the configuration units are realized by each program being loaded to the RAM 203, and executed by the CPU 201.

A screen control unit 401 performs control of a menu display for a user to instruct a firmware update. An information processing unit 402 performs various types of processing for the image forming apparatus 101. The processing here may be processing during the normal operation mode. A download unit 403 performs downloading of firmware from the distribution server 102. An update control unit 404 performs control related to updating.

An immediate update unit 405 provides a function for updating immediately after downloading firmware from the distribution server 102. A manual update unit 406 provides a function for a user to perform a manual update of downloaded firmware. A time designated update unit 407 provides a function performing a time designated update of downloaded firmware. A regular update unit 408 provides a function to regularly update on a period such as every week, every other week or the like. A background extraction unit 409 provides a function for performing firmware extraction processing during the normal operation mode. The immediate update unit 405, the manual update unit 406, the time designated update unit 407, the regular update unit 408 and the background extraction unit 409 are each executed according to settings of a user or the like. Details of the settings will be explained later.

Figure 5:
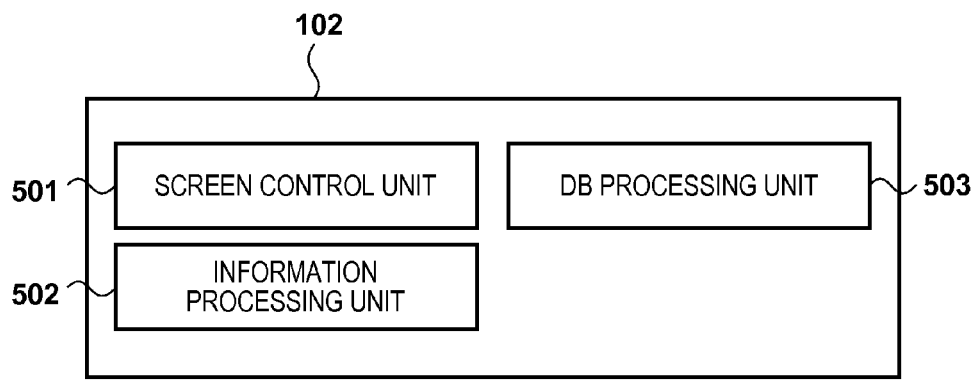
FIG. 5 A view for showing an example of a software configuration of a distribution server.

FIG. 5 is a view for showing an example of a software configuration of the distribution server 102. Programs indicated here, which realize the configuration units, are stored to an HDD 304, and the configuration units are realized by each program being loaded to a RAM 303, and executed by a CPU 301.

A screen control unit 501 performs control of a menu display for firmware registration or the like. An information processing unit 502 performs various processing. Here, control related to the distribution server 102 on the whole is given. A DB processing unit 503 refers to DB information held in the distribution server 102 and performs registration thereof.

[Processing Flow]

Figure 6:
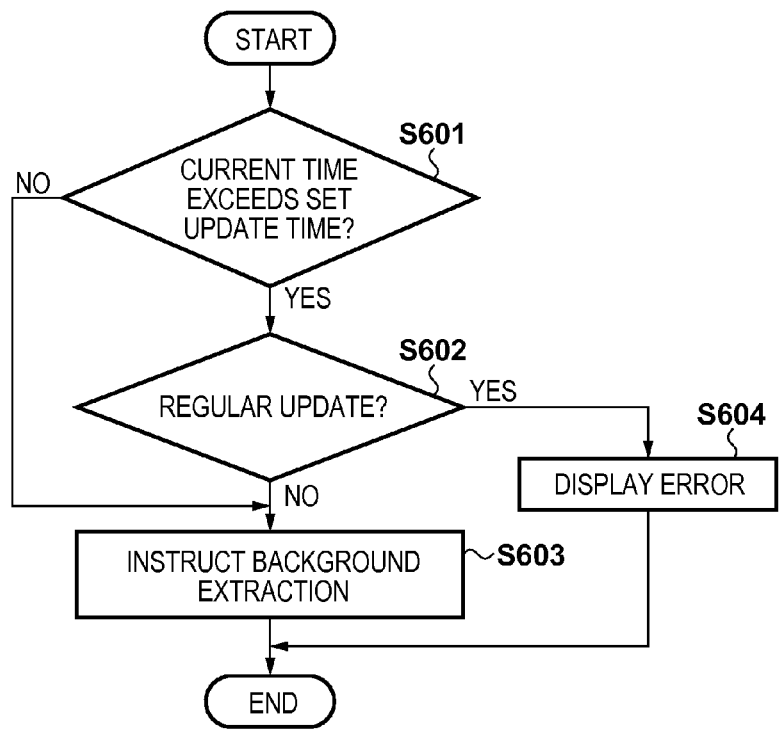
FIG. 6 A flowchart of a process of the image forming apparatus.

FIG. 6 is a flowchart for showing processing performed by the update control unit 404 upon a next boot in a case where a power-off occurs while firmware extraction processing (a background extraction) is performed in the image forming apparatus 101. The power-off occurs in a case where a user turns off the power supply of the image forming apparatus 101, for example. Here, in a case where it is determined whether or not the power-off is performed, configuration may be taken such that the image forming apparatus 101 sets a flag to be on during the background extraction determination is made by referring to this flag, for example.

Here, the relationship between the update method and a background extraction is described. In a case where downloading the firmware is not completed before the designated time which is set as the update start timing when the regular update is designated, the firmware will not be used after the downloading is completed. In other words, in the case of the regular update, when update cannot be performed at the update time, the processing goes to waste if the background extraction for the firmware is performed because there will be no case where the downloaded firmware will be used after this.

On the other hand, in a case where the time designated update is selected for the distribution reservation, when the downloading is not completed before the update time, it is possible to perform a manual update after completing the downloading. In other words, in a case of the distribution reservation, even in a case where update cannot be performed at the update time, if the background extraction is performed, the processing does not go to waste because the downloaded firmware is used later. Accordingly, when the update time passes upon the next booting after the apparatus is powered off, the background extraction is retried in cases other than the regular update.

In step S601, the update control unit 404 determines whether or not the current time exceeds the set update time. With this, the first determination unit is realized. Note, here "a time" is described, but in a case where a period is designated (an update date/time) in units of days or dates, the determination may be made based on that. In a case where the update time is not exceeded (NO in step S601), the update control unit 404 makes the instruction of the background extraction to the background extraction unit 409 in step S603. Then, the background extraction unit 409 executes the background extraction processing on the downloaded firmware again. In a case where the update time is exceeded (YES in step S601), the update control unit 404 determines whether or not the elapsed update time relates to the regular update in step S602. With this, the second determination unit is realized. Note that configuration is taken such that even in a case where it is set that a plurality of update methods are executed, when the update time relating to the regular update elapses, the background extraction is not performed again.

In the case where it is not the regular update (NO in step S602) the update control unit 404 performs an instruction of the background extraction to the background extraction unit 409 in step S603. In the case of the regular update (YES in step S602), the update control unit 404 performs an error display in step S604. With this, the image forming apparatus 101 notifies the user that updating of the firmware in the regular update has failed. At this time, configuration may be taken such that the user is notified that the update has failed by a power-off. This processing flow is then terminated.

In a case where the background extraction of the firmware relating to the regular update is not completed upon the power-off and the starting time of the regular update has already passed upon the restart, the background extraction for the firmware is not performed again.

[Menu Screens]

Figure 7:
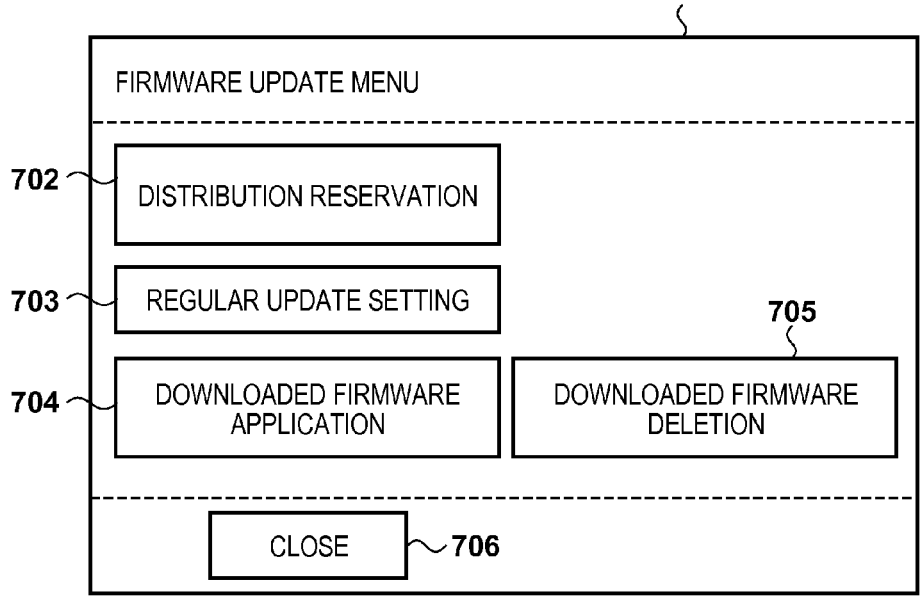
FIG. 7 A view for showing an example of an firmware update menu screen according to the image forming apparatus.
Figure 8:
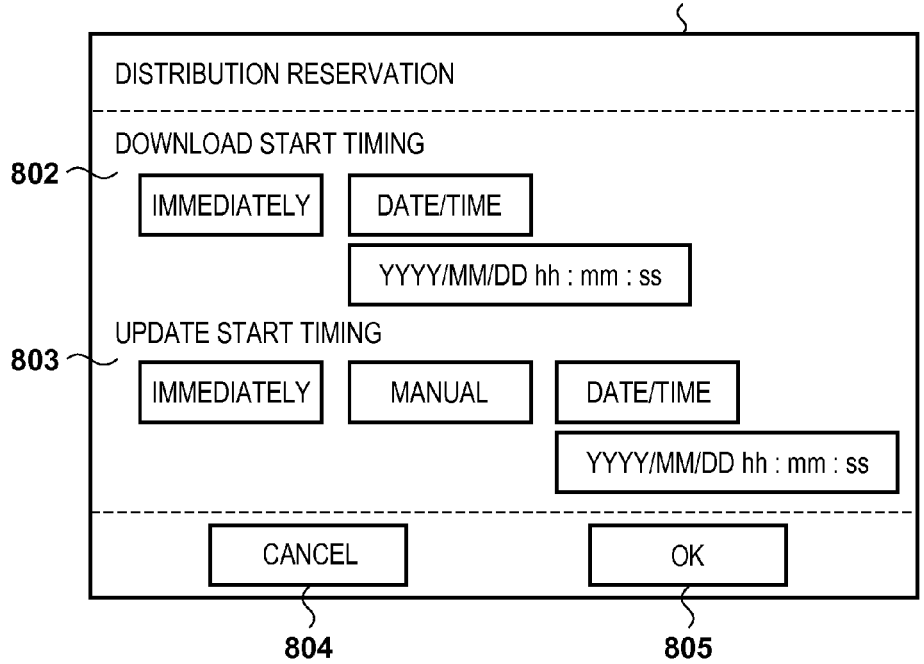
FIG. 8 A view for showing an example of a firmware distribution reservation menu screen of according to the image forming apparatus.
Figure 9:
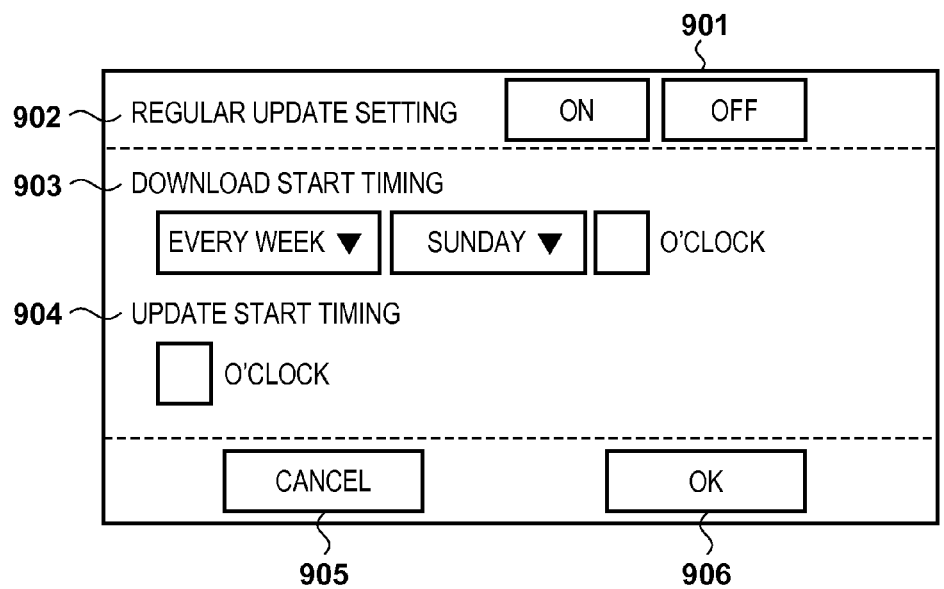
FIG. 9 A view for showing an example of a regular update setting menu screen according to the image forming apparatus.

FIG. 7 shows the example configuration of the update menu screen of the firmware. A menu screen 701 is displayed on the display unit 206 of the image forming apparatus 101. In a case where a distribution reservation button 702 is pressed, a transition to a screen 801 shown in FIG. 8 is made. In a case where a regular update setting button 703 is pressed, a transition to a screen 901 shown in FIG. 9 is made. In a case where a downloaded firmware application button 704 is pressed, the downloaded firmware is applied. Here, it is assumed that the downloaded firmware is already extracted by the background extraction. In a case where a downloaded firmware deletion button 705 is pressed, the downloaded firmware is deleted. A close button 706 is a button for closing the menu screen 701. Note, setting may be performed to update by both the distribution reservation and the regular update.

The screen 801 shown in FIG. 8 is one example of a distribution reservation screen and is displayed on the display unit 206 of the image forming apparatus 101. A menu 802 is a menu for setting the download start timing, and it sets a timing for when the download unit 403 obtains the firmware from the distribution server 102. In a case where "immediately" is designated, the download unit 403 immediately starts obtaining the firmware after an OK button 805 is pressed. In a case where "date/time" is designated, the download unit 403 starts obtaining the firmware at the designated date/time. A menu 803 is a menu for setting the update start timing. In a case where "immediately" is designated, the immediate update unit 405 performs update immediately after the downloading is completed. In a case where "manual" is designated, the download unit 403 does not perform update immediately after the downloading of the firmware is completed. Note, the background extraction is performed after the downloading.

In a case where the downloaded firmware application button 704 is pressed by the user, the manual update unit 406 performs an update of the firmware that is downloaded and for which the background extraction is performed. In a case where "date/time" is designated, the time designated update unit 407 performs an update of the firmware at the designated date/time. However, in a case where the downloading is not completed before the designated date/time, an error termination is performed so that the user is able to perform a manual update later. A cancel button 804 is a button for cancelling the update settings. The OK button 805 is a button for finalizing the content of the update that is set.

The screen 901 shown in FIG. 9 is one example of a regular update setting menu, and is displayed on the display unit 206 of the image forming apparatus 101. A setting 902 is a setting item for switching ON and OFF the regular update settings. A setting 903 is a setting item for setting the download start timing. Here, each of a period (every week or every other week), a day (Sunday-Saturday) and a time (0-23) is selected. A setting 904 is a setting item for performing setting of the update start timing, and the time (0-23) is set. Note, in a case where the downloading is not completed by the designated time, an error is generated and the firmware is discarded. A cancel button 905 is a button for cancelling the settings. An OK button 906 is a button for finalizing the content that is input.

With the present embodiment, when the power is turned off during the background extraction, it becomes possible to perform recovery processing for the background extraction except in the case where the firmware is discarded. As a result, the recovery processing upon a firmware extraction failure can be switched according to the update method, and pointless recovery processing for the background processing can be reduced.

Note, the regular update is explained as an example of a case where the firmware is discarded in step S602 in FIG. 6, but embodiments are not limited to this. Any other update method in which the firmware is discarded can be processed in the same way.

Second Embodiment

In the first embodiment, recovery processing upon a background extraction failure is automatically performed, depending on whether it is a regular update or not, in a case where the update time is passed upon restarting. In the second embodiment, explanation will be given for a method where the user performs a setting and recovery processing is performed in accordance with the setting.

Figure 10:
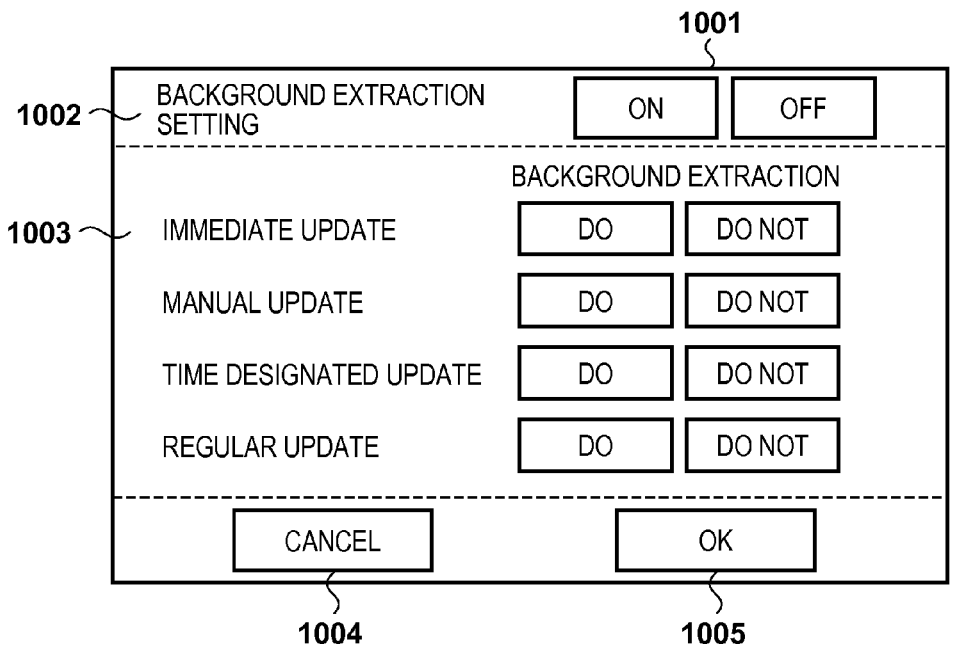
FIG. 10 A view for showing an example of a background extraction setting menu screen according to the image forming apparatus.

A screen 1001 shown in FIG. 10 is one example of a screen for performing a background extraction setting. A setting 1002 is a setting item for setting the background extraction setting to be enabled/disabled, and a background setting for each update method is enabled if the setting is turned ON. Settings 1003 are setting items for setting whether or not the background extraction is performed for each of the immediate update, the manual update, the time designated update, and the regular update. A cancel button 1004 is a button for cancelling the settings. An OK button 1005 is a button for reflecting the designated setting.

With the present embodiment, it becomes possible to perform the background extraction setting for each update method individually, and to perform the background extraction processing in accordance with the setting.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-145383, filed Jul. 15, 2014, which is hereby incorporated by reference herein in its entirety.

What is claimed is:

1. An image forming apparatus capable of executing update processing for updating firmware, the image forming apparatus comprising:
   a processing device; and
   a memory storing instructions that, when executed by the processing device, cause the image forming apparatus to perform:
   (1) setting, as a setting regarding the update processing, either (a) a first setting indicating that the update processing is executed periodically or (b) a second setting indicating that the update processing is executed at a designated, non-periodical date and time,
   (2) obtaining update firmware for updating firmware of the image forming apparatus, wherein the update firmware is obtained from a server on a network,
   (3) executing extraction processing for extracting the update firmware obtained in the obtaining, wherein extracting the update firmware is performed in the background during a normal operation mode to reduce the time in the updating mode and downtime,
   (4) in a case where the extraction processing is interrupted and the image forming apparatus re-boots after the interruption, determining, in order to retry the extraction processing in the background, whether the first setting or the second setting is set in the setting,
   (5) deciding, in a case where it is determined that the first setting is set and that a set timing for performing the update processing has already passed upon the re-boot after the interruption, not to execute extraction processing corresponding to the first setting, wherein, in a case where it is decided to not execute the extraction processing, the image forming apparatus is caused to perform execution of an error display,
   (6) deciding, in the deciding, in a case where it is determined, in the determining, that the first setting is set and that a set timing for performing the update processing has not passed, to execute the extraction processing corresponding to the first setting, and
   (7) deciding, in the deciding, in a case where it is determined, in the determining, that the second setting is set and that a date and time for performing the update processing has passed, to re-execute the extraction processing.

2. A method for controlling an image forming apparatus capable of executing update processing for updating firmware, the method comprising:
   setting, as a setting regarding the update processing, either (a) a first setting indicating that the update processing is executed periodically or (b) a second setting indicating that the update processing is executed at a designated, non-periodical date and time;
   obtaining update firmware for updating firmware of the image forming apparatus, wherein the update firmware is obtained from a server on a network;
   executing extraction processing for extracting the update firmware obtained in the obtaining, wherein extracting the update firmware is performed in the background during a normal operation mode to reduce the time in the updating mode and downtime;
   in a case where the extraction processing is interrupted and the image forming apparatus re-boots after the interruption, determining, in order to retry the extraction processing in the background, whether the first setting or the second setting is set in the setting;
   deciding, in a case where it is determined that the first setting is set and that a set timing for performing the update processing has already passed upon the re-boot after the interruption, not to execute extraction processing corresponding to the first setting, wherein, in a case where it is decided to not execute the extraction processing, the image forming apparatus is caused to perform execution of an error display;
   deciding, in a case where it is determined, in the determining, that the first setting is set and that a set timing for performing the update processing has not passed, to execute the extraction processing corresponding to the first setting; and deciding, in a case where it is determined, in the determining, that the second setting is set and that a date and time for performing the update processing has passed, to re-execute the extraction processing.

3. A non-transitory computer-readable storage medium storing a program for causing a computer capable of executing update processing for updating firmware to execute:
  setting, as a setting regarding the update processing, either (a) a first setting indicating that the update processing is executed periodically or (b) a second setting indicating that the update processing is executed at a designated, non-periodical date and time;
  obtaining update firmware for updating firmware of the computer, wherein the update firmware is obtained from a server on a network;
  executing extraction processing for extracting the update firmware obtained in the obtaining, wherein extracting the update firmware is performed in the background during a normal operation mode to reduce the time in the updating mode and downtime;
  in a case where the extraction processing is interrupted and the computer re-boots after the interruption, determining, in order to retry the extraction processing in the background, whether the first setting or the second setting is set in the setting;
  deciding, in a case where it is determined that the first setting is set and that a set timing for performing the update processing has already passed upon the re-boot after the interruption, not to execute extraction processing corresponding to the first setting, wherein, in a case where it is decided to not execute the extraction processing, the image forming apparatus is caused to perform execution of an error display;
  deciding, in a case where it is determined, in the determining, that the first setting is set and that a set timing for performing the update processing has not passed, to execute the extraction processing corresponding to the first setting; and
  deciding, in a case where it is determined, in the determining, that the second setting is set and that a date and time for performing the update processing has passed, to re-execute the extraction processing.

* * * * *